Sept. 8, 1925.
C. M. SYLVESTER
1,553,272
TRAP FOR DRAINS AND THE LIKE
Filed Aug. 5, 1924
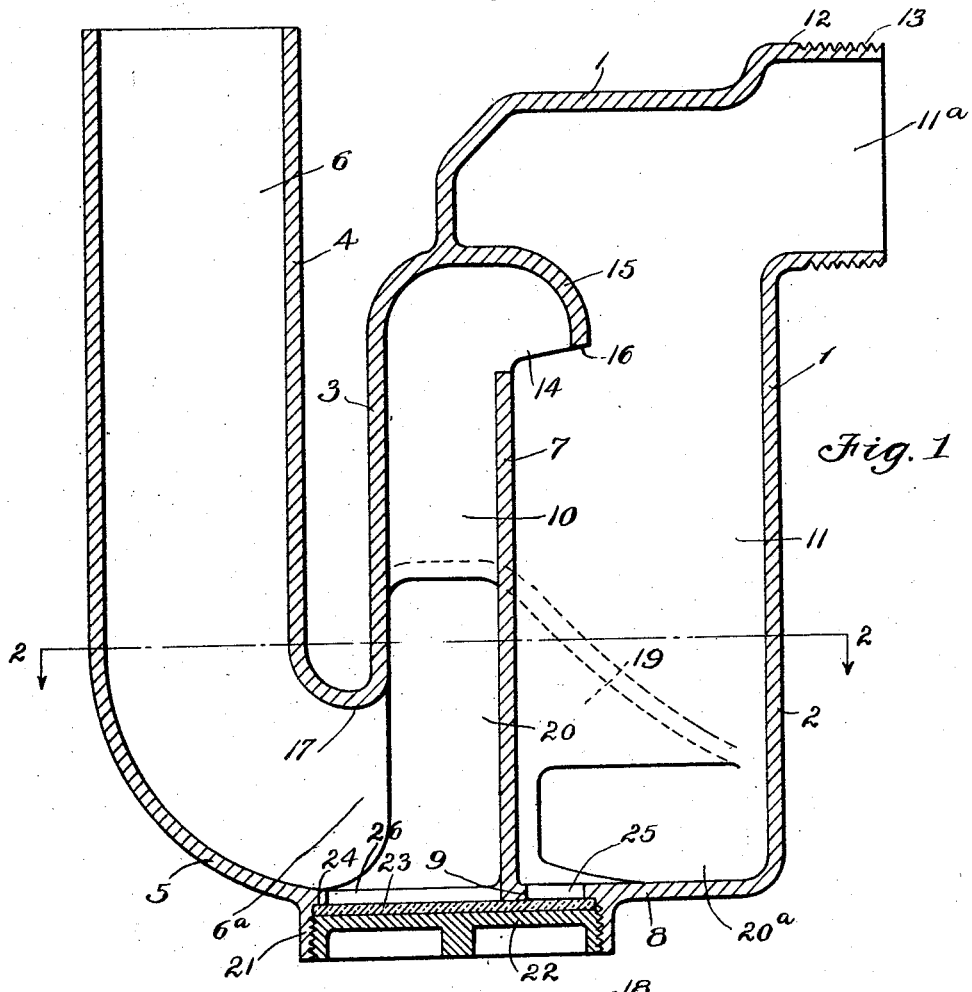
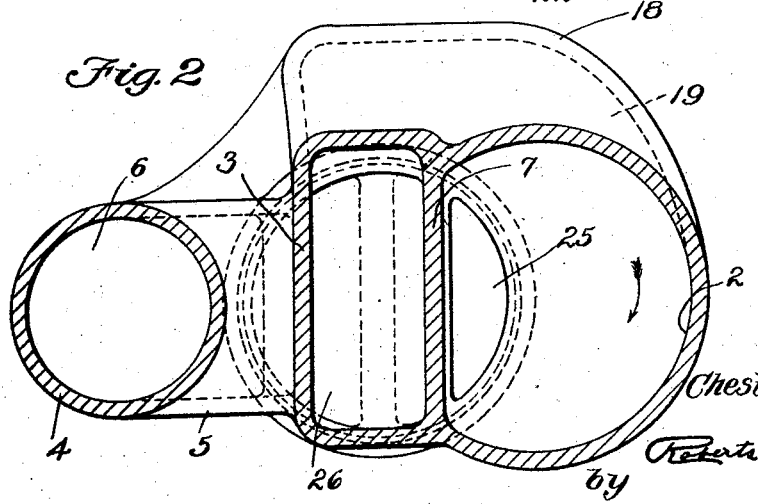
Inventor
Chester M. Sylvester
by Roberts Roberts Cushman
Att'ys Patented Sept. 8, 1925.

1,553,272

UNITED STATES PATENT OFFICE.

CHESTER M. SYLVESTER, OF MIDDLEBORO, MASSACHUSETTS.

TRAP FOR DRAINS AND THE LIKE.

Application filed August 5, 1924. Serial No. 730,202.

*To all whom it may concern:*

Be it known that I, CHESTER M. SYLVESTER, a citizen of the United States of America, and resident of Middleboro, in the county of Plymouth and State of Massachusetts, have invented new and useful Improvements in Traps for Drains and the like, of which the following is a specification.

This invention pertains to drain traps and more particularly to self-venting traps capable of maintaining an adequate water seal even when subjected to powerful siphonic action, a trap of this general type being disclosed in my Patent No. 1,455,279 dated May 15, 1923.

Principal objects of the present invention are to provide a trap of the aforesaid type but of improved construction and in particular to provide a trap capable in an even more certain manner of maintaining its water seal when exposed to siphonic action such as produced by a large head of water dropping past the trap through the maximum distance met in practice; to provide a trap in which the water is caused to circulate with a swirling motion whereby through its scouring action to prevent the deposit of sediment or filth upon the interior walls of the trap; to provide a trap whose several chambers are all readily accessible through a single clean-out opening; to provide a trap so designed that even a small quantity of air is sufficient to break the siphonic action almost instantaneously; and to devise a trap of such external shape that leakage from the inlet to the vent chamber cannot take place.

In the accompanying drawing one preferred embodiment of the invention is illustrated by way of example, Fig. 1 being a vertical section through the improved trap illustrating the various chambers and passages therein; and Fig. 2 being a horizontal section on the line 2—2 of Fig. 1.

Referring to the drawings the numeral 1 indicates a casing of any suitable convenient external form, preferably having one of its side walls curved to a circular arc, as indicated at 2. The opposite wall 3 of the casing may be curved or not as desired, being here shown as substantially flat.

The trap also comprises a tube or pipe 4 extending vertically downward substantially parallel of the wall 3 of the casing 1 and spaced from the latter. The lower end of the pipe or tube 4 is curved at 5 and united to the wall 3 of the casing, the interior of the tube 4 constituting an inlet passage or chamber 6.

The interior of the casing 1 is divided by means of a vertical partition 7 which extends upwardly from the plane of the lower wall 8 of the casing, being provided at its lower edge with a seat member 9 lying substantially in the plane of the bottom 8 of the casing, the purpose of such seat member being hereinafter described.

The division wall 7 separates a vent chamber 10 from an outlet chamber 11, the inlet passage 6 communicating freely with the vent chamber at the point $6^a$. Preferably the relative dimensions of the chambers 6, 10 and 11 are substantially such as described in my afore-mentioned patent, such chambers being vetically elongate and substantially parallel to each other.

The upper part of the casing 11 is preferably provided with a lateral offset 12 of circular section providing a discharge passage $11^a$, the offset being screw threaded either externally or internally at 13 for attachment to a pipe coupling. The upper end of the tube 4 may likewise be threaded for connection to a pipe or may be secured to such pipe by means of solder or other attaching means.

The vent chamber 10 communicates by means of a downwardly curved passage 14 at its upper end with the outlet chamber 11. The upper wall of the passage 14 is formed by a downwardly curved hood 15 which terminates at 16 at a level substantially below the bottom of the discharge passage $11^a$ of the outlet chamber 11.

The casing is provided at one side near its lower part with a lateral offset 18. This offset is hollow, providing a fluid passage 19 which opens at 20 into the vent chamber 10 and at $20^a$ into the lower part of the outlet chamber 11. As indicated in Fig. 1 the upper wall of the passage 19 inclines downwardly so that the opening $20^a$ is restricted as compared with the opening 20. The passage 19 is so curved laterally that fluid passing therethrough is substantially reversed in its direction of flow and enters the chamber 11 substantially tangent to the inner surface of the wall 2 of the casing.

The lower wall 8 of the casing is provided with a downwardly projecting annular boss 21 defining a clean-out opening so positioned that the lower edge of the partition 7 forms a chord of the circular opening.

The boss 21 is here shown as internally screw-threaded for the reception of a removable cap 22 although the cap or other form of closure may be removably secured in place in any other desired manner. A gasket 23 is preferably associated with the cap 22 and is held by the latter against an annular seat 24 formed at the inner part of the opening. When the cover comprising the cap and gasket are in place the latter also seats against the seat member 9 of the partition 7 so as completely to close communication between the chambers 10 and 11 below the partition.

Upon removal of the cover the outlet chamber 11 becomes accessible through the part 25 of the opening while the chambers 10 and 6 also are accessible through the part 26 of the opening. It is thus possible to clean out all three chambers through the one clean-out opening, although two of the chambers at least are normally sealed from each other at the opening.

In operation a water seal is normally maintained in the trap at a height at least up to the top 17 of the passage 6ª. When the trap is subjected to a powerful siphonic action due to the dropping of a large head of water past the discharge passage 11ª the water in the trap is sucked upwardly in both of the chambers 10 and 11. This upward movement of the water in the trap continues until the water level in the inlet chamber 6 drops to a point below the point 17. The air which now enters at the top of the passage 6ª immediately rises in the vent chamber 10 and escapes beneath the edge 16 into the relative narrow part of the upper casing 11 where it becomes instantaneously available to break the vacuum in the casing. As the top 17 of the passage 6ª is slightly higher than the top of passage 20ª all air entering beneath the vent chamber tends strongly to move upwardly in the latter chamber so that even a slight quantity of air is thus available to break the seal.

Moreover, as pointed out in my prior patent, the downward discharge of the air and water from chamber 10 acts in a positive manner to arrest the upward movement of the water in the outlet chamber 11 so that a very effective means is provided for breaking the vacuum and preventing emptying of the trap.

This efficient use of the air results in a greatly improved operation of the trap and even when subjected to the most rigid tests the trap maintains a water seal of adequate depth.

During the nominal operation of the trap, when the fluid flows through the passage 6ª out through the opening 20 and through the passage 19 into the chamber 11, it enters the latter at its lower part in a path substantially tangent to the inner surface of the wall 2. This creates a horizontal swirl or eddy which effectually scours the inner surface of the casing and thus removes any deposit which may tend to accumulate thereon. As the fluid must first pass up in the vent chamber 10 and then move out laterally from the same, a somewhat similar scouring action is obtained in the lower part of the vent chamber. As above described all three chambers are readily available for cleaning by removal of the cover 22.

The spacing of the pipe 4 from the wall 3 of the casing is intended positively to avoid any possibility of leakage between the passage 6 and the upper part of the vent chamber 10 such as might occur through a defective casting were the wall of the pipe 4 coincident with the wall 3 of the casing. Although the spacing of the parts 3 and 4 as herein shown is desirable this is regarded as a minor feature of the invention, as the passage 6 may as in my prior patent be formed in an integral part of the casing 1 if desired.

While but a single offset member 18 with its passage 19 is here disclosed it is contemplated that under certain circumstances the casing might be provided with a similar offset and passage at its opposite sides, although the single passage herein disclosed is ordinarily adequate and sufficient for the intended purpose.

Manifestly changes in the external shape and dimensions of the trap may be made as occasion may warrant or as experience may direct without departing from the spirit of the invention.

I claim:

1. A trap comprising a casing having a vent chamber and an outlet chamber therein, and an inlet tube spaced from and substantially parallel with the outer wall of the vent chamber, said tube being connected to the lower part of the casing, the interior of the tube constituting an inlet chamber and communicating with the lower part of the vent chamber.

2. A trap comprising a casing having a vent chamber and an outlet chamber, and a passage connecting said chambers, said passage being constructed and arranged to deliver fluid with a swirling motion into the outlet chamber.

3. A trap comprising a casing having a vent chamber and an outlet chamber, said chambers communicating at their upper parts, and means for producing an eddy in fluid entering the outlet chamber whereby to scour the walls of the latter.

4. A trap comprising a casing having a vent chamber and an outlet chamber provided with a curved inner wall, and means for conducting fluid from the vent chamber and for delivering such fluid into the outlet chamber in a direction substantially tangent to the curved wall of the latter.

5. A trap comprising a casing having a vent chamber and an outlet chamber, a passage connecting said chambers, said passage leading laterally from the lower part of the vent chamber and delivering the fluid into the outlet chamber in a direction substantially opposite to the direction of its flow from the vent chamber.

6. A trap having an inlet chamber, a vent chamber and an outlet chamber, the inlet chamber communicating by means of an opening with the lower part of the vent chamber, and a passage leading from the vent chamber to the lower part of the outlet chamber, the top of the delivery end of said passage being below the top of the opening connecting the inlet chamber with the vent chamber.

7. A trap having an inlet chamber, a vent chamber and an outlet chamber, an opening between the inlet chamber and the lower part of the vent chamber, and a passage having a downwardly inclined upper wall leading from the vent chamber to the lower part of the outlet chamber.

8. A trap comprising a casing having a vent chamber and an outlet chamber, said casing having a lateral offset near its bottom, and a curved passage extending from the vent chamber through said lateral offset and opening into the lower part of the outlet chamber.

9. A trap comprising a casing, a vertical partition extending upwardly from the bottom of the casing, said partition separating a vent chamber from an outlet chamber, and a curved passage leading from the vent chamber and entering the side of the outlet chamber near the bottom of the latter.

10. A trap having an inlet chamber, a vent chamber and an outlet chamber, an opening connecting the vent and outlet chambers at their upper ends, and passages connecting the lower parts of the inlet and outlet chambers with the vent chamber, the upper wall of the passage leading from the vent chamber to the outlet chamber being downwardly inclined and terminating at a point below the top of the passage connecting the inlet and vent chambers.

11. A trap having an inlet chamber, a vent chamber and an outlet chamber, a vertical partition separating said last named chamber and preventing direct flow of fluid from one to the other, and a curved passage leading from the vent chamber to the lower part of the outlet chamber.

12. A trap having an inlet chamber, a vent chamber and an outlet chamber, the latter chambers being connected by an opening near their upper ends, a passage connecting the inlet chamber with the lower part of the vent chamber, and a passage connecting the vent chamber with the lower part of the outlet chamber, the parts being so constructed and arranged as to tend to prevent the direct flow of air from the inlet chamber into the outlet chamber except through the opening connecting the latter with the upper part of the vent chamber.

13. A trap having an inlet chamber, a vent chamber and an outlet chamber, said chambers being vertically elongate and substantially parallel, a passage connecting the inlet and vent chambers, and means constraining fluid flowing from the vent to the outlet chambers to move in a curved path.

14. A trap comprising a casing divided by a vertical partition to form vent and outlet chambers, a passage connecting the vent chamber with the lower part of the outlet chamber, a discharge passage leading from the outlet chamber near its top, and a passage connecting the vent chamber with the upper part of the outlet chamber, said passage terminating in a down turned portion having its lower end below the level of the discharge passage.

Signed by me at Middleboro, Massachusetts, this tenth day of July, 1924.

CHESTER M. SYLVESTER.